United States Patent [19]

Sakaguchi et al.

[11] Patent Number: 5,003,169

[45] Date of Patent: Mar. 26, 1991

[54] PHOTOELECTRIC SWITCH HAVING CHANGEABLE LENGTH

[75] Inventors: Tomikazu Sakaguchi; Masahide Matsushima, both of Osaka, Japan

[73] Assignee: Keyenci Corporation, Osaka, Japan

[21] Appl. No.: 428,728

[22] Filed: Oct. 30, 1989

[30] Foreign Application Priority Data

Nov. 14, 1988 [JP] Japan .................................. 63-288087

[51] Int. Cl.$^5$ .............................................. G01V 9/04
[52] U.S. Cl. ...................................... 250/221; 250/239
[58] Field of Search ................ 250/221, 222.1, 239, 250/208.2, 208.4; 340/555, 556

[56] References Cited

U.S. PATENT DOCUMENTS

| | | | |
|---|---|---|---|
| 4,266,124 | 5/1981 | Weber et al. | 250/221 |
| 4,742,337 | 5/1988 | Haag | 340/556 |
| 4,749,853 | 6/1988 | Salim | 250/221 |

Primary Examiner—David C. Nelms
Attorney, Agent, or Firm—Sughrue, Mion, Zinn Macpeak & Seas

[57] ABSTRACT

A photoelectric switch which includes a light-emitting section having a plurality of light-emitting elements arranged in a line, and a light-detecting section having a plurality of light-detecting elements arranged in a line in such a manner that the light-emitting elements confront with the light-detecting elements, thus providing a multi-optical path therebetween. Each of the light-emitting section and light-detecting section is formed by connecting a base unit to a relay unit and/or an end unit, whereby the length or configuration of the photoelectric switch can be readily changed by changing the number or configuration of the relay unit connected to the base unit.

7 Claims, 19 Drawing Sheets

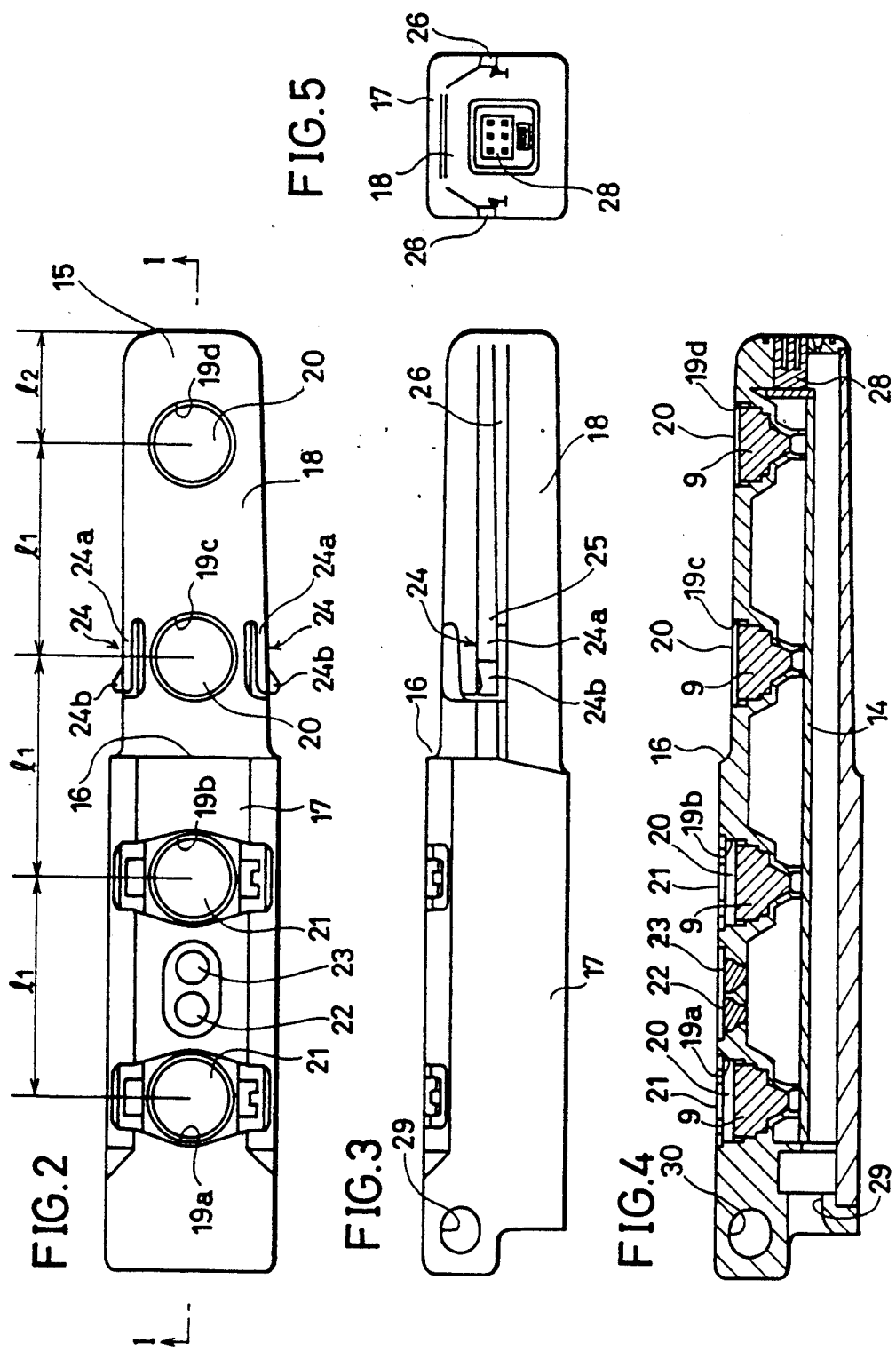

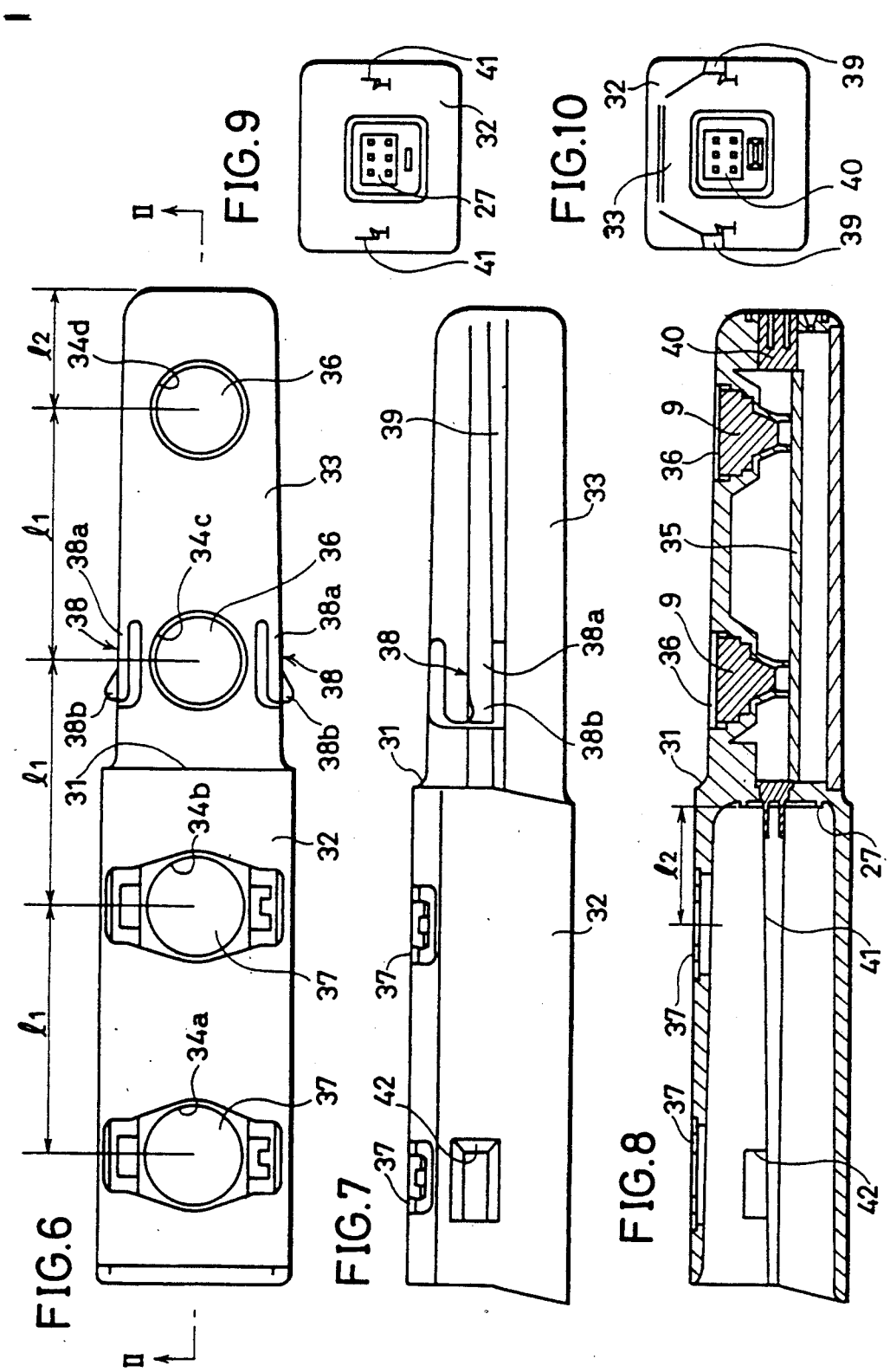

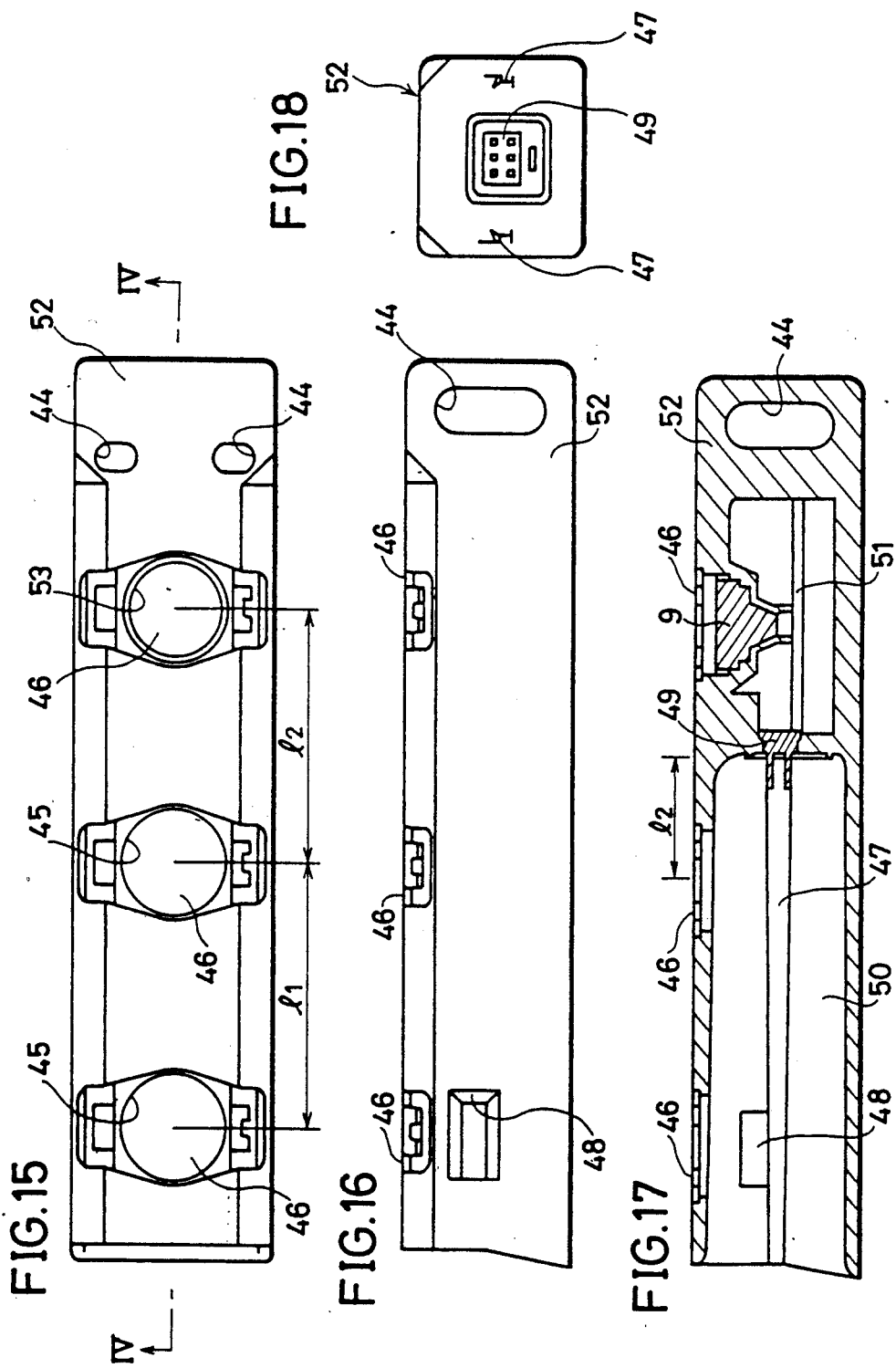

FIG.31
(A)
(B)
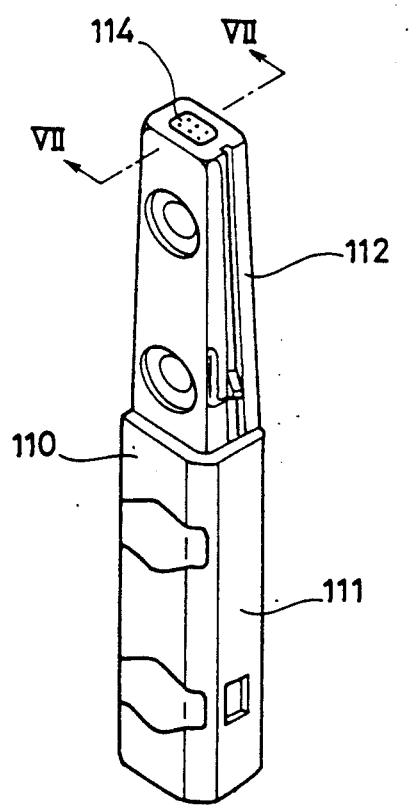
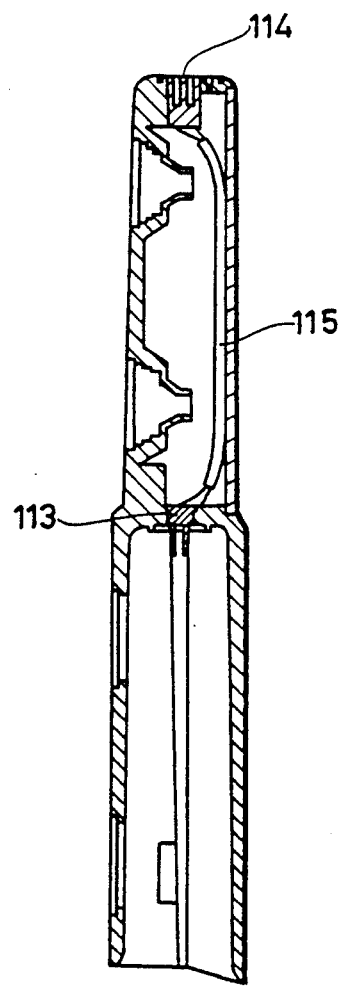

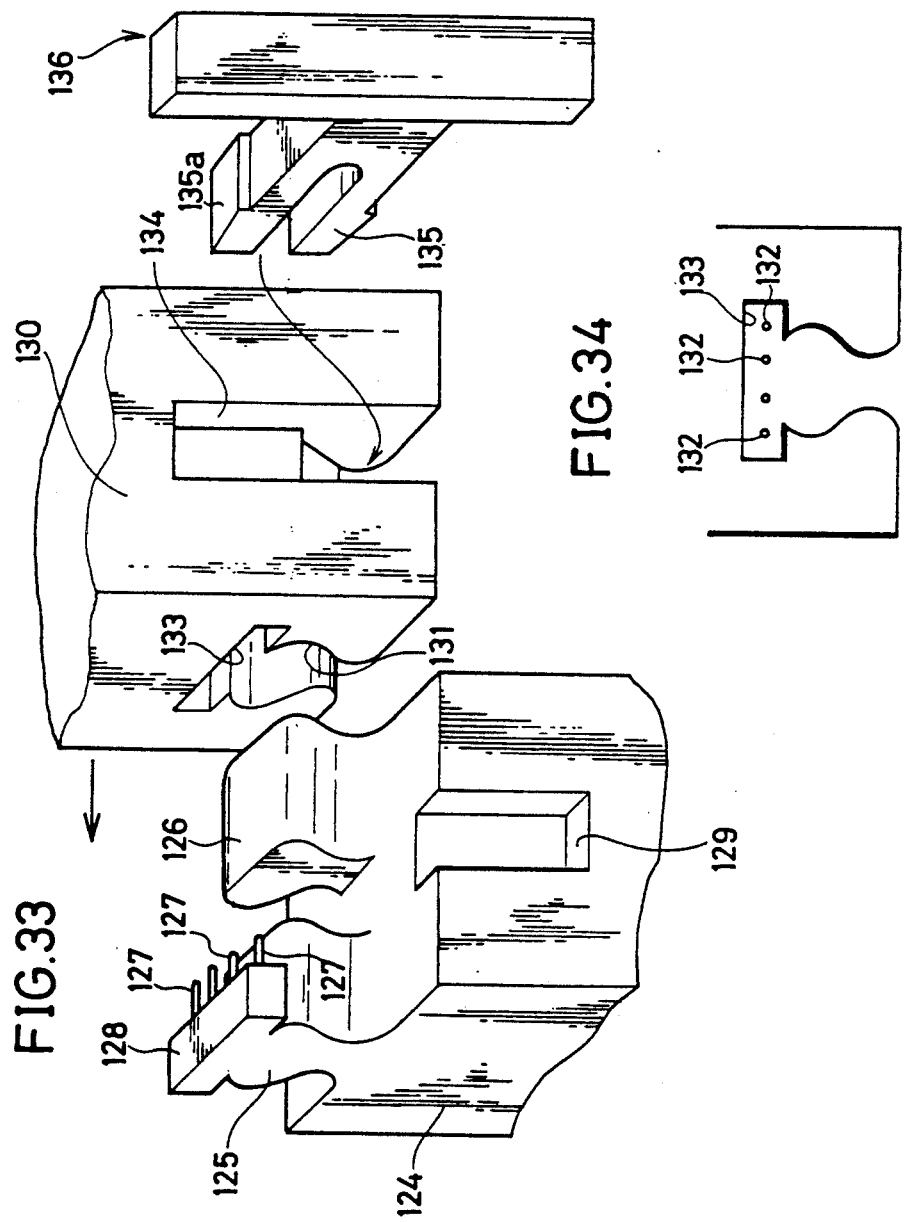

PHOTOELECTRIC SWITCH HAVING CHANGEABLE LENGTH

BACKGROUND OF THE INVENTION

The present invention relates to a photoelectric switch in which a light-emitting section composed of a plurality of light-emitting elements is confronted with a light-detecting section composed of a plurality of light-detecting elements, thus forming a multi-optical-path. More particularly, the invention relates to a photoelectric switch in which the degree of freedom in the arrangement of optical paths is improved.

Heretofore, in order to detect the presence or absence of an object in a predetermined plane, a photoelectric switch as shown in FIG. 35 has generally been employed. The switch has a light-detecting section 1 in which a plurality of light-detecting elements 2 are arranged in a line, and a light-emitting section 3 in which a plurality of light-emitting elements 4 are arranged in such a manner as to confront with respective ones of the light-detecting elements 2. Accordingly, a plurality of optical paths 5 are formed between the light-detecting elements 2 and the light-emitting elements 4.

When an object to be detected enters a detection plane 6 (indicated by a two-dot chain line) and crosses at least one optical path 5, a light beam from at least one light-emitting element 4 is not applied to the confronting light-detecting element 2, whereby the presence of the object can be detected.

However, the above-described photoelectric switch suffers from the following difficulties:

The light-emitting section 3 and the light-detecting 1 section are constant in length. Hence, in order to change the size of the detection plane 6 according to the object to be detected, a plurality of photoelectric switches different in length must be provided.

Depending of the configuration of the object to be detected (hereinafter referred to merely as "an object" when applicable), for instance in the case of an object having a hole, sometimes it is necessary to provide a non-detection region in a part of the detection plane 6. In this case, it is necessary to additionally provide a photoelectric switch which has a non-detection part. Furthermore, in order to change the position of the non-detection region, it is necessary to provide a photoelectric switch which is different in the arrangement of light-emitting and light-detecting elements.

SUMMARY OF THE INVENTION

Accordingly, an object of this invention is to provide a photoelectric switch which can handle a variety of objects different in size and configuration.

The foregoing and other objects of the invention have been achieved by the provision of a photoelectric switch comprising a light-emitting section having a plurality of aligned light-emitting elements, and a light-detecting section having a plurality of light-detecting elements aligned in such a manner as to confront with respective ones of the light-emitting elements, in which each of the light-emitting section and light-detecting section comprises: a base unit including a housing accommodating the elements and an electrical circuit, the housing having a step substantially at the middle portion thereof formed in such a manner that the housing is divided into a connected part, which extends from the step towards one of the ends of the housing, and a base part, which extends towards the other end, the connected part being thinner than the base part, the base unit having openings in the front surface thereof at equal intervals in which the elements are arranged; a relay unit including a housing into which the connected part of the base unit is inserted and which accommodates the elements and an electrical circuit, the housing of the relay unit having a step substantially at the middle portion thereof formed in such a manner that the housing is divided into a connected part, which extends from the step towards one of the ends of the relay unit, and a hollow connecting part, which extends from the step towards the other ends so as to receive the connected part, the connecting part being thinner than the connected part, the relay unit having openings in the front surface thereof at equal intervals in which the elements are arranged; and an end unit including a housing into which the connected part of the base unit or relay unit is inserted, the housing having a hollow connecting part which has openings in the front surface thereof at equal intervals in which no elements are previously arranged, the base unit being connected to the end unit through at least one relay unit so that the light-emitting section or light-detecting section has a desired number of the elements.

The nature, principle and utility of the invention will become more apparent from the following detailed description and the appended claims when read in conjunction with the accompanying drawings.

BRIEF DESCRIPTION OF THE DRAWINGS

In the accompanying drawings:

FIGS. 2 through 5 show a base unit in the photoelectric switch, of which FIG. 2 is a front view of the base unit, FIG. 3 is a plan view of the base unit, FIG. 4 is a sectional view taken along a line I—I in FIG. 2, and FIG. 5 is a left side view of the base unit;

FIGS. 6 through 10 show a first example of a relay unit in the photoelectric switch, of which FIG. 6 is a front view of the relay unit, FIG. 7 is a plan view of the relay unit, FIG. 8 is a sectional diagram taken along a line II—II in FIG. 6, FIG. 9 is a right side view of the relay unit, and FIG. 10 is a left side view of the relay unit;

FIGS. 11 through 14 show a first example of an end unit in the photoelectric switch, of which FIG. 11 is a front view of the end unit, FIG. 12 is a plan view of the end unit, FIG. 13 is a sectional view taken along a line III—III in FIG. 11, and FIG. 14 is a left side view of the end unit;

FIGS. 15 through 18 shows a second example of the end unit, of which FIG. 15 is a front view of the end unit, FIG. 16 is a plan view of the end unit, FIG. 17 is a sectional view taken along a line IV—IV in FIG. 15, and FIG. 18 is a left side view of the end unit;

FIGS. 22 through 24 show the base unit, the relay unit and the end unit which have been connected to one another, of which FIG. 22 is a front view showing the units, FIG. 23 is a plan view of the units, and FIG. 24 is a sectional view taken along a line V—V in FIG. 22;

FIGS. 25(A) through 25(D) are front views showing other examples of the photoelectric switch of the invention, of which FIG. 25(A) is a front view of the photoelectric switch in which the base unit is directly connected to the first example of the end unit, FIG. 25(B) is a front view of the photoelectric switch in which the base unit is directly connected to the second example of the end unit, FIG. 25(C) is a front view of the photoelectric switch in which the base unit is connected through two relay units to the first example of the end unit, and FIG. 25(D) is a front view of the photoelectric switch in which the base unit is connected through two relay units to the second example of the end unit;

FIG. 31(A) is a perspective view showing a sixth example of the relay unit which is used for provision of a non-detection region;

FIG. 31(B) is a sectional view taken along a line VII—VII in FIG. 31(A);

FIGS. 33 and 34 are diagrams illustrating a further method of connecting the units to form the photoelectric switch, of which FIG. 33 is an exploded perspective view showing the connecting parts of the units, and FIG. 34 is a diagram showing the structure of a connector employed in the method.

DESCRIPTION OF THE PREFERRED EMBODIMENTS

Preferred embodiment of the invention will now be described with reference to the accompanying drawings.

Figure 1:
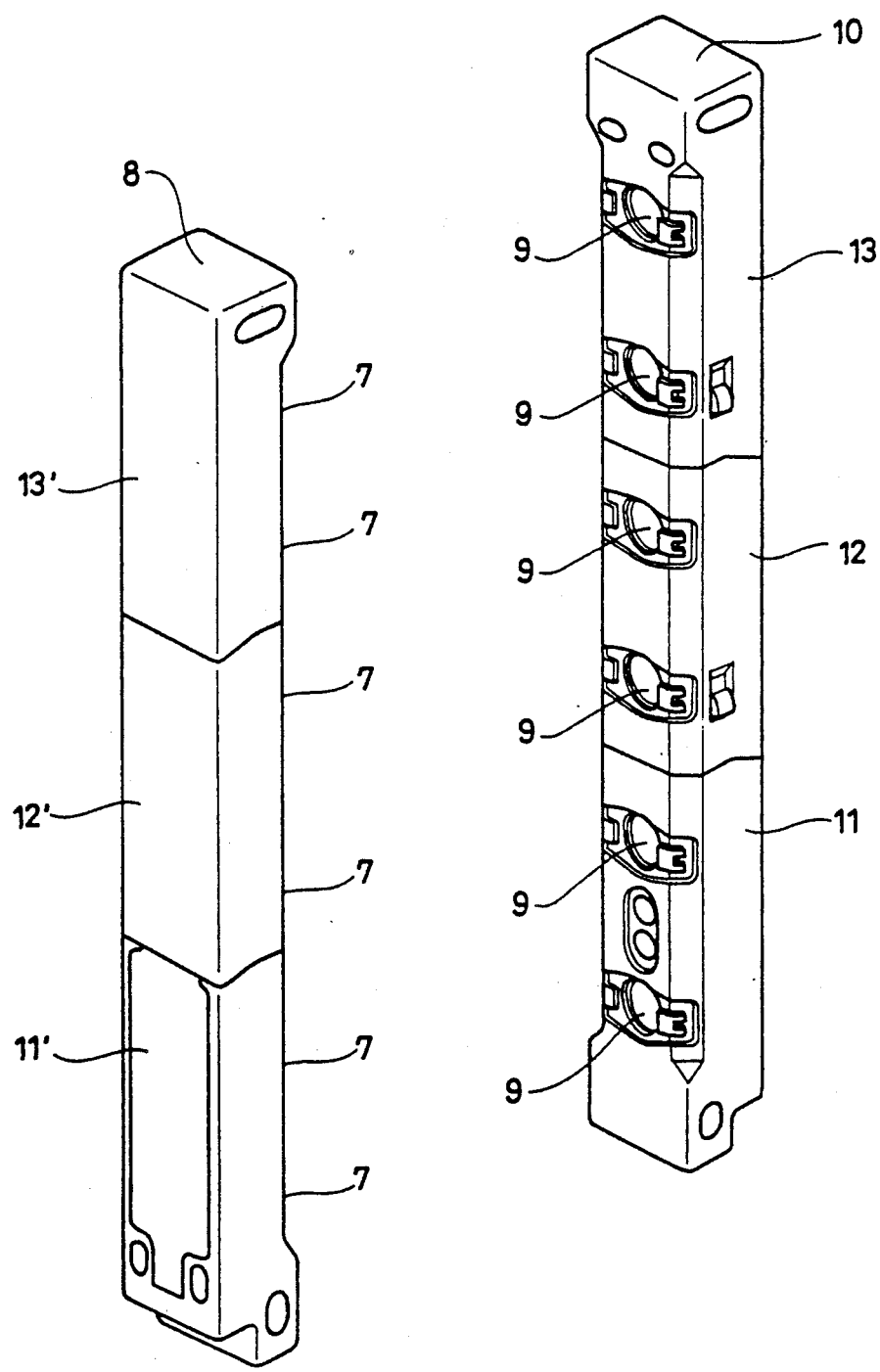
FIG. 1 is a perspective view showing a first example of a photoelectric switch constructed according to this invention.
Figure 14:
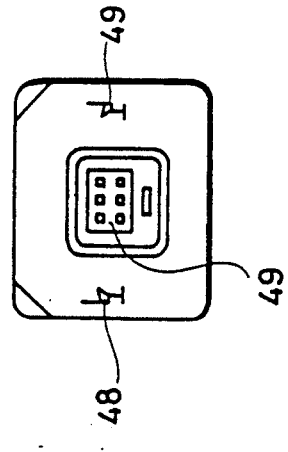
Figure 11:
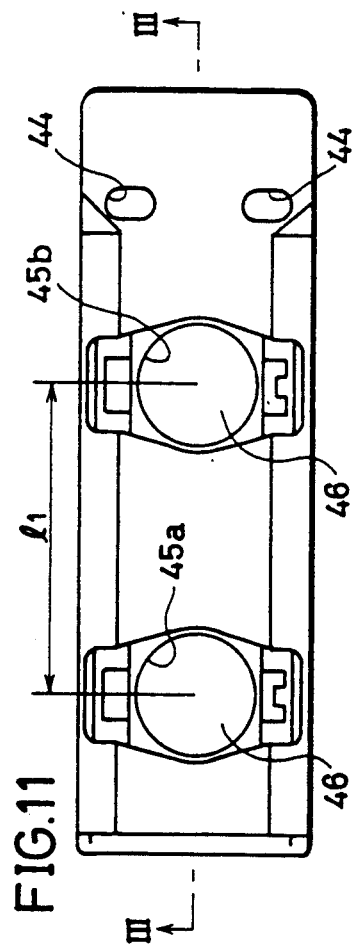
Figure 12:
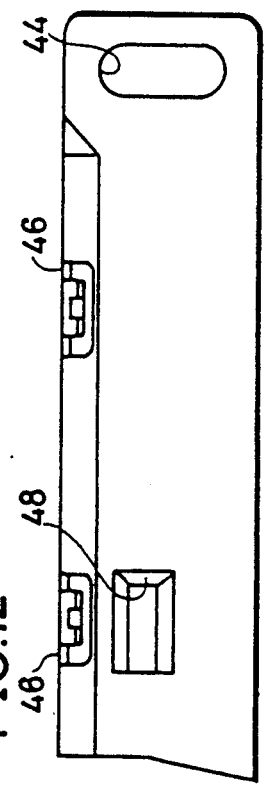
Figure 13:
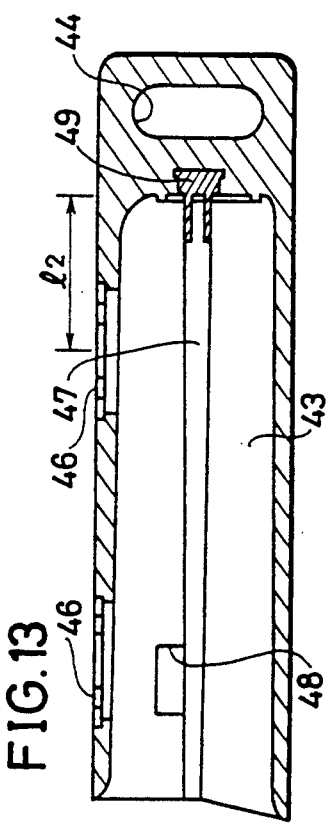

A first example of a photoelectric switch according to the invention, as shown in FIG. 1, includes a light-emitting section 8 including six light-emitting elements 7 aligned vertically, and a light-detecting section 10 including six light-detecting elements 9 aligned vertically in such a manner as to confront with respective ones of the light-emitting elements, with six optical paths formed therebetween. The light-emitting elements 7 of the light-emitting section 8 are light-emitting diodes, laser diodes, or the like, and the light-detecting elements 9 of the light-detecting section 10 are photodiodes. These light-emitting elements 7 and light-detecting elements 9 are positioned so that the output light beams of the light-emitting elements 7 are effectively applied to the respective light-detecting elements 9.

The light-emitting section 8 and the light-detecting section 10 are different in the type of optical elements employed and in the arrangement of electrical circuit; however, they are substantially the same in external appearance. Therefore, only the light-detecting section 10 will be described.

The light-detecting section 10 includes a base unit 11, at least one relay unit 12 which can be connected to the top of the base unit 11, and an end unit 13 which can be connected to the top of the base unit 11 or the relay unit 12.

FIG. 1 shows the fundamental structure of the light-detecting section, which is made up of the base unit 11, one relay unit 12, and the end unit 13.

The base unit 11 is shown in FIGS. 2 through 5 in more detail. The base unit 11 is an elongated housing accommodating a substrate 14 on which the light-detecting elements 9 and electrical circuit elements are mounted. The housing 15 has a step 16 substantially at the middle thereof which divides the housing 15 into two parts, namely, a base part 17 and a connected part 18 which is smaller in thickness than the base part 17. Four openings 19a, 19b, 19c and 19d are formed in the front surface of the base part 17 and the connected part 18 at predetermined intervals $\lambda_1$. More specifically, the distances between the openings 19a and 19b, between the openings 19b and 19c, and between the openings 19c and 19d are equal to one another, and the distance $\lambda_1$ between the opening 19d and the end of the connected part 18 is shorter than $\lambda_1$. The light-detecting elements 9 are mounted on the substrate 14 at corresponding ones of the openings 19a through 19d. The openings 19a through 19d are covered with lenses 20 serving as filters. The openings 19a and 19b of the base part 17 are additionally covered with protective covers 21 made of a transparent material such as a fluororesin which has a high corrosion resistance. A red detection display lamp 22 and a green stability display lamp 23 are provided on the base part 17 between the openings 19a and 19b. The detection display lamp 22 is turned on upon detection of an object, and the stability display lamp 23 when the photoelectric switch is operating stably.

The connected part 18 is slightly tapered towards the end, and has engaging members 24 on both sides of the opening 19c (see FIG. 3) arranged in such a manner that the engaging members 24 are flush with one side of the connected part 18. Each of the engaging members 24 is composed of an elastic piece 24a which is elastic about the fulcrum point 25, and an engaging protrusion 24b extending from the base of the elastic piece 24a and protruding from the side of the connected part. The connected part 18 has guide grooves 26 formed in both side walls in such a manner that the guide grooves 26 extend along the central axes of the side walls and diverge towards the end of the connected part 18. As shown in FIG. 5, the connected part 18 has a female connector 28 at its end which is electrically connected to the male connectors 27 and 49 of the relay unit 12 and the end unit 13.

The base unit 11 has mounting holes 29 and 30 to mount it at a desired detecting position.

The relay unit 12 is shown in FIGS. 6 through 10 in more detail. The relay unit 12 is designed so as to be connected to the base unit 11, and it has substantially the same configuration as the base unit 11. The relay unit 12 has a step 31 substantially at its middle which divide the relay unit 12 into two parts, namely, a connecting part 32, which is hollow, and a connected part 33, which is smaller in thickness than the connecting part 32. Openings 34a, 34b and 34c are formed in the front surface of the parts 32 and 33 at equal intervals $\lambda_1$, and the distance between the opening 34d and the end of the connected part 33 is set to $\lambda_1$. The connected part 33 accommodates a substrate 35 on which electrical circuit elements are mounted. The light-detecting elements 9 are mounted on the substrate 35 at the openings 34c and 34d. The openings 34c and 34d are covered with lenses serving as filters, and are further covered with protective covers 37 made of a transparent material such as a fluororesin which has a high corrosion resistance.

Engaging members 38 similar in configuration to the above-described engaging members 24 of the connected part 18 of the base unit 11 are formed on both sides of the connected part 33. That is, the engaged part 38 has elastic pieces 38a, engaging protrusions 38b, and guide grooves 39 which are similar to those 24a, 24b and 26 of the base unit 11. As shown in FIG. 10, the connected part 33 has a female connector 40 at its end which is to be connected to the male connector 27 of another relay unit or the male connector 49 of the end unit 13.

Elongated protrusions 41 are formed on both inner side walls of the connecting part 32 in such a manner that they extend along the central axes thereof. The width of each elongated protrusion 41 increases towards the step 31. The elongated protrusions 41 are engaged with the guide grooves 26 of the base unit 11 or the guide grooves 39 of another relay unit. The connecting part 32 has engaging holes 42 which are engaged with the engaging protrusions 24b of the base unit 11 or the engaging protrusions 38b of another relay unit 12.

FIGS. 6 through 8 show the relay unit 12 with two light-detecting elements 9. The number of light-detecting elements 9 mounted on the relay unit is not always limited to two. For instance, if relay units each having one light-detecting element 9 and relay units each having two light-detecting elements 9 are fabricated, then a photoelectric switch having a desired number of light-detecting elements 9 can be provided with ease.

The end unit 13 is shown in FIGS. 11 through 14 in detail. The end unit 13, which is engaged with the connected part 18 of the base unit 11 or the connected part 33 of the relay unit 12, is in the form of a hollow housing with a connecting part 43. Openings 45a and 45b are formed in the front surface of the end unit 13 with a distance $\lambda_1$ therebetween. The openings 45a and 45b are aligned with the openings 19c and 19d, respectively, of the connected part 18 of the base unit 11 when the end unit is connected to the base unit 11, or with the openings 34c and 34d, respectively, of the connected part 33 of the relay part 12 when the end part is connected to the relay part. The openings 45a and 45b are covered with protective covers 46 made of a transparent material such as fluororesin which has a high corrosion resistance. The end unit 13 has a mounting hole 44 at the end.

Elongated protrusions 47 are formed on both inner side walls of the connecting part 43 extending along the central axes thereof, with the width of each elongated protrusion 47 increasing towards the end. The elongated protrusions 47 are engaged with the guide grooves 26 of the base unit 11 or the guide grooves 39 of the relay unit 12. The connecting part 43 has engaging holes 48 which are engaged with the engaging protrusions 24b of the base unit 11, or the engaging protrusions 38b of the relay unit 12.

The end unit 13 has a male connector on the inner wall of the end portion, which is connected to the female connector 28 of the base unit 11, or the female connector 40 of the relay unit 12. The structure of the end unit 13 is not limited to that shown in FIGS. 11 through 14; for instance, it may be replaced by an end unit as shown in FIGS. 15 through 18. The end unit 52 has a connecting part 50 and accommodates a substrate 51 on which a light-detecting element 9 and electrical circuit elements are mounted in such a manner that the light-detecting element is in alignment with an opening.

The electrical circuit of the photoelectric switch and its operation will be described with reference to FIGS. 19 and 20.

Figure 19:
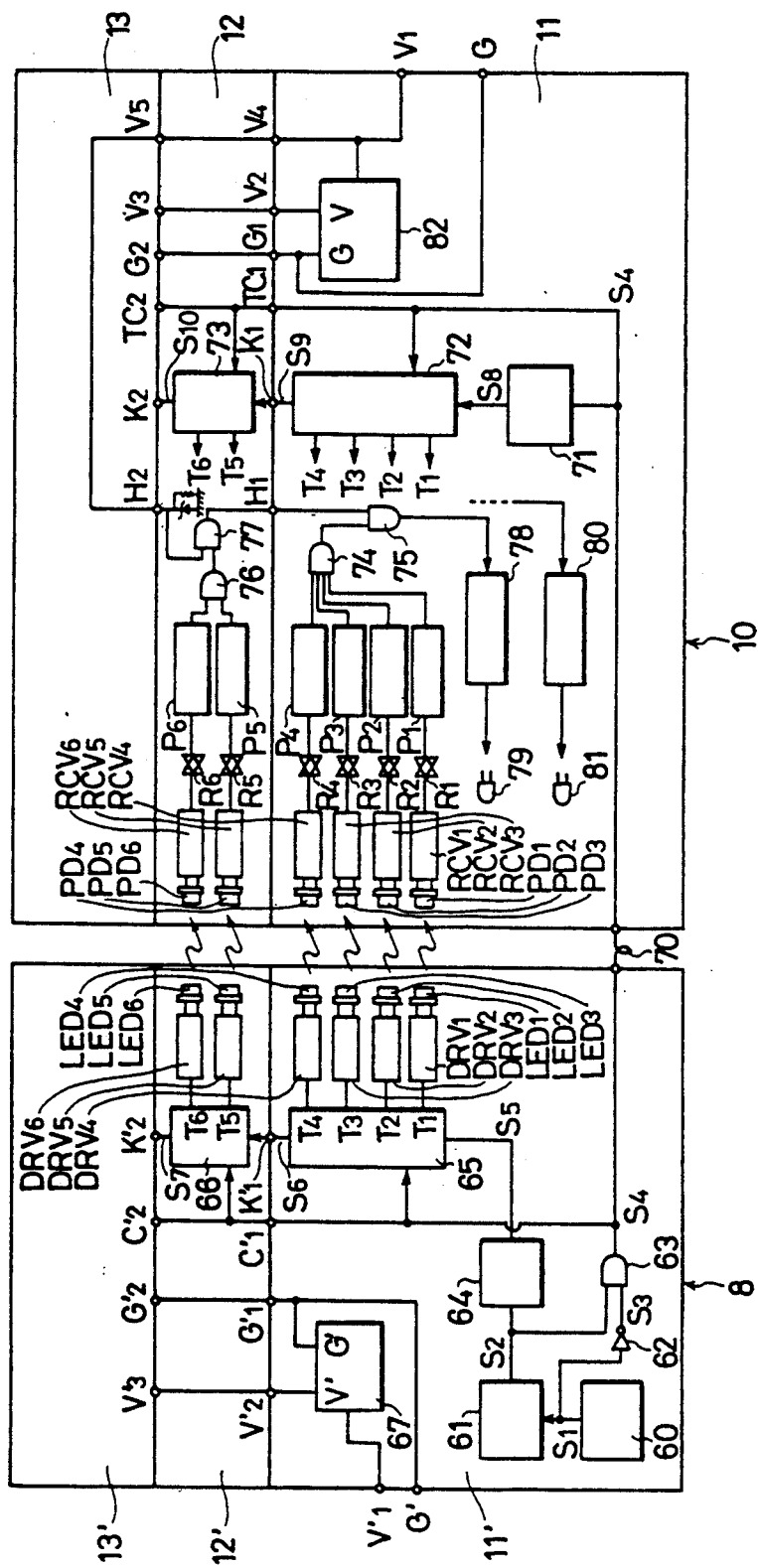
FIG. 19 is a circuit diagram showing an electrical circuit of the photoelectric switch shown in FIG. 1.

FIG. 19 shows the light-emitting section 8 on the left-hand side and the light-detecting section 10 on the right-hand side. In each of sections 8 and 10, each block surrounded by a solid line shows an area of a unit. The small circles "o" between the units indicates the connections of the male connectors 27 and 49 and the female connectors 28 and 40. Hereinafter, the units forming the light-emitting section will be designated by the reference numerals with the suffix (').

In FIG. 19, $V_1$ designates an input terminal to which the voltage of an external power source is applied, and G, a ground terminal. Power sources 67 and 82 are provided to supply voltages to the base unit and the relay unit.

In the light-emitting section, the base unit 11' includes an oscillator circuit 60, the output signal $S_1$ of which is applied to a counter 61. In the counter 61, the oscillator output signal is frequency-divided into a frequency-division output signal $S_2$. The oscillator output signal $S_1$ is further applied to an inverter 62, which provides an output signal $S_3$. The output signal $S_3$ is applied to one input terminal of an AND gate 63, the other input terminal of which receives the output signal $S_2$ of the counter 61. Thus, the AND gate 63 outputs a reference clock signal $S_4$.

The output signal $S_2$ of the counter 61 is further supplied to a timing pulse generator 64, where it is inverted and delayed, thus providing a timing signal $S_5$.

The timing signal $S_5$ and the reference clock signal $S_4$ are applied to a first shift register 65. When the timing signal $S_5$ is at a high level, the first shift register 65 outputs a driving timing signal $T_1$ in response to the first pulse of the reference clock signal $S_4$. Thereafter, in response to the succeeding pulses of the reference clock signal $S_4$, the shift register 65 outputs drive timing signals $T_2$, $T_3$ and $T_4$, and it provides a first carrier signal $S_6$ together with the drive timing signal $T_4$. The first carrier signal $S_6$ is applied through a connector terminal $K_1'$ to a second shift register 66. The second shift register 66 shifts the first carrier signal $S_6$ in synchronization with the reference clock signal $S_4$, thus producing timing signals $T_5$ and $T_6$, and a second carrier signal $S_7$. In this embodiment the reference clock signal $S_4$ consists of 16 pulses and it is continuously produced even after the drive timing signal $T_6$ has been outputted. However, in the photoelectric switch in FIG. 1, the number of optical paths is only six, and there is provided no shift register for outputting drive timing signals following the drive timing signal $T_6$, and therefore no drive timing signal is outputted after the drive timing signal $T_6$. In other words, the number of optical paths may be increased to 16 at the maximum with the relay unit connected. The number of optical paths may be increased or decreased by changing the length (duration) of the frequency division output signal $S_2$.

Figure 20:
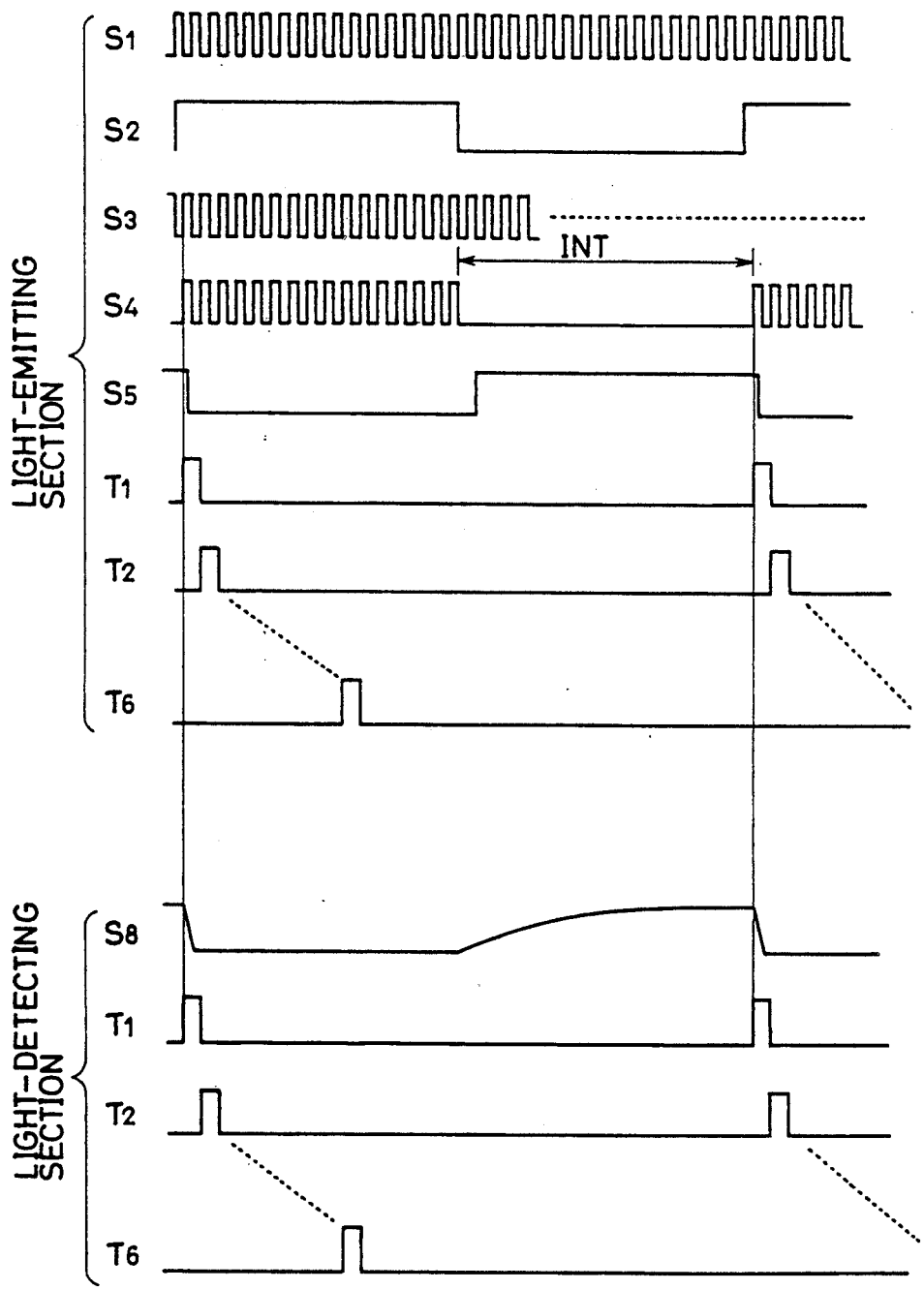
FIG. 20 is a timing chart for a description of the operation of the electrical circuit shown in FIG. 19.

The shift registers 65 and 66 provide the drive timing signals $T_1$ through $T_6$ successively in the above-described manner (see FIG. 20). The drive timing signals $T_1$ through $T_6$ thus provided are successively applied to light-emitting element drive circuits $DRV_1$, $DRV_2$, $DRV_3$, $DRV_4$, $DRV_5$ and $DRV_6$, so that light-emitting elements $LED_1$, $LED_2$, $LED_3$, $LED_4$, $LED_5$ and $LED_6$ emit light beams successively. The reason why the light-emitting elements are activated successively is to prevent each light-emitting element from being adversely affected by its adjacent light-emitting element.

As is apparent from FIG. 20, the reference clock signal $S_4$ is not outputted for a period INT because another photoelectric switch may be installed adjacent to the present photoelectric switch. That is, it is intended that the adjacent photoelectric switch not be operated during the period INT thereby to prevent the erroneous operation.

On the other hand, the light-detecting section 10 operates as follows: In order to operate the light-detecting section 10 in synchronization with the light-emitting section 8, the reference clock signal $S_4$ is transmitted from the light-emitting section through an external cable 70 to the light-detecting section 10. The light-detecting section 10 operates in response to the reference clock signal $S_4$, i.e., in synchronization with the light emission timing.

The reference clock signal $S_4$ is supplied to a timing pulse generator 71, where it is inverted and integrated. With the time constant of the integrating circuit, the pulses of the reference clock signal $S_4$ are leveled; that is the output signal of the timing pulse generator 71 is as indicated at $S_8$ in FIG. 20. The output signal $S_8$ is applied as a timing signal to a third shift register 72 for synchronization with the operation of the light-emitting section. That is, when the timing signal $S_8$ is at a high level, a light-detecting timing signal $T_1$ is outputted in response to the first pulse of the reference clock signal $S_4$. Thereafter, light-detecting timing signals $T_2$, $T_3$ and $T_4$ are successively outputted in response to the succeeding pulses of the reference clock signal $S_4$, and a third carrier signal $S_9$ is outputted together with the light-detecting timing signal $T_4$. The third carrier signal $S_9$ is applied through a connector terminal K to a shift register 73, where it is shifted in synchronization with the reference clock signal $S_4$, thus providing a fourth carrier signal $S_{10}$.

The light-detecting timing signals $T_1$, $T_2$, ..., $T_6$ are applied to analog switches $R_1$, $R_2$, ..., $R_6$, respectively. On the other hand, the output signals of the light-emitting section are applied to light-detecting elements $PD_1$, $PD_2$, ..., $PD_6$ where they are converted into electrical currents. The electrical currents are applied through light-detecting circuits $RCV_1$, $RCV_2$, ..., $RCV_6$ and the analog switches $R_1$, $R_2$, ..., $R_6$ to a signal processing circuits $P_1$, $P_2$, ..., $P_6$ respectively. Thus, only the output signal of the light-detecting element which confronts with the light-emitting element which has emitted a light beam is applied to the respective signal processing circuit.

The outputs of the signal processing circuits $P_1$ through $P_4$ are applied to an AND gate 74 which is provided for discriminating the light-detecting states of all the light-detecting elements in the base unit 11 of the light-detecting section. When any one of the light-detecting elements $PD_1$ through $PD_4$ receives no light beam, the output of the AND gate 74 is set to a low level. The output of the AND gate 74 is supplied to an AND gate 75. On the other hand, the outputs of the signal processing circuits $P_5$ and $P_6$ in the relay unit 12 of the light-detecting section are applied to an AND gate 76, which is provided for discriminating the light-detecting states of all the light-detecting elements in the relay unit 12 of the light-detecting section. When either one of the light-detecting elements $PD_5$ and $PD_6$ receives no light beam the output of the AND gate 76 is set to a low level. The output of the AND gate 76 is applied to one input terminal of an AND gate 77. When the end unit 13 is not connected to the relay unit, the other terminal of the AND gate 77 is at low level, and therefore the AND gate 77 is maintained closed. As a result, the output of the AND gate 76 is not transmitted to the AND gate 77. When the end unit 13 is connected to the relay unit in the light-detecting section, a voltage is supplied from the end unit 13 through a connector terminal $H_2$ to the other input terminal of the AND gate 77, so that the latter transmits the output of the AND gate 76 through a connector terminal $H_1$ to an AND gate 75. Thus, the AND gate 75, according to the outputs of the AND gates 74 and 77, supplies a signal to an output circuit 78 which indicates the light-detecting states of the base unit 11 and the relay unit 12 in the light-detecting section. In response to the output signal of the AND gate 75, the output circuit 78 turns on a detection display light-emitting diode 79, thereby providing a detection output. Accordingly, when one of the light-detecting elements $PD_1$–$PD_6$ does not receive the light beam emitted from the confronting light-emitting diode, the detection display light-emitting diode 79 is turned on.

In the above-described embodiment, a stabilization detecting output with a high threshold value for detection is provided for detection with high reliability. The circuit for producing this signal is similar to the above-described detecting circuit except that the detection threshold value is set higher. The required operating signals are provided by the signal processing circuits. As for the circuit, FIG. 19 shows only an output circuit 80 and a light-emitting diode for stabilization detection display.

Figure 21:
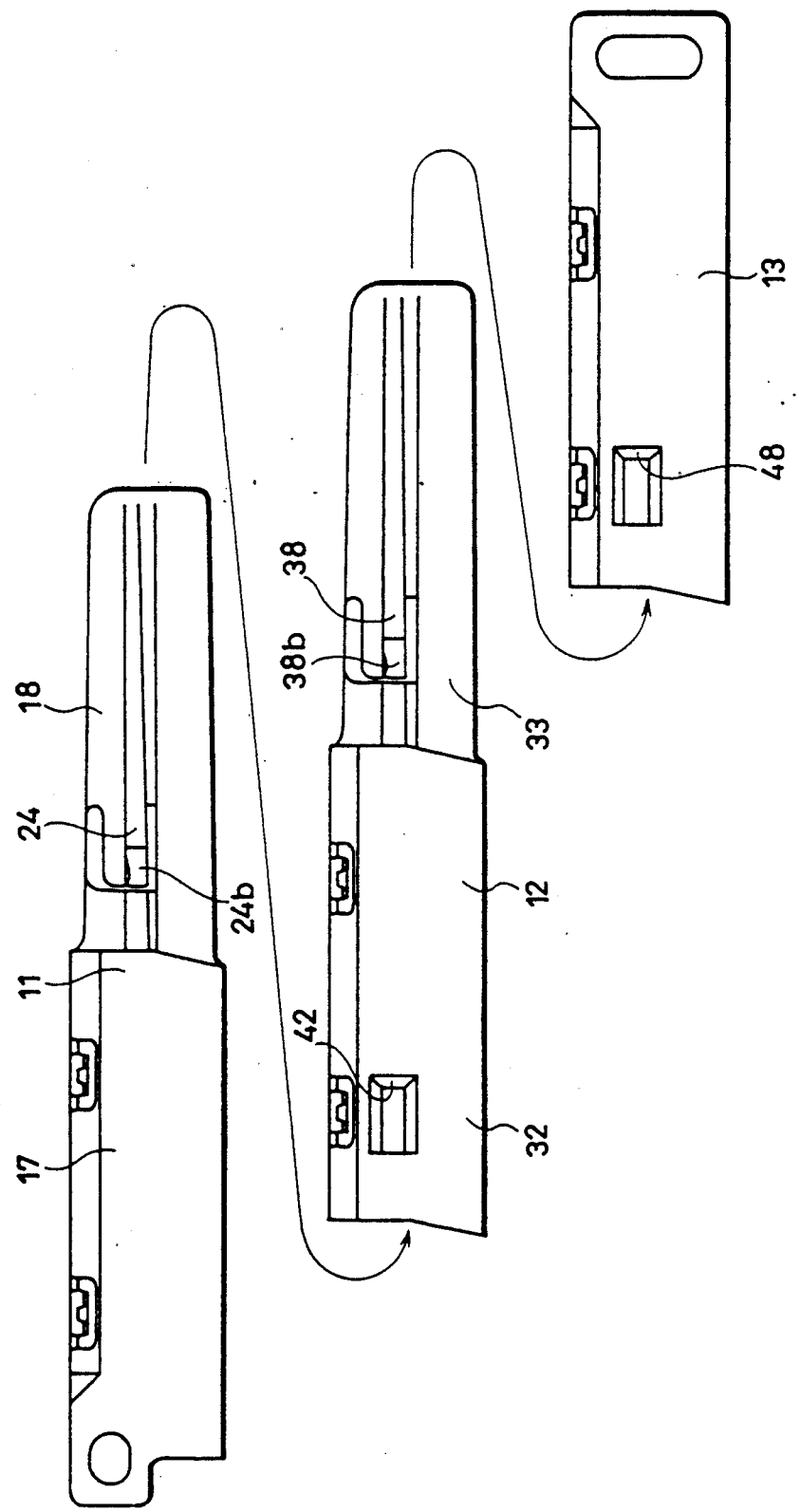
FIG. 21 is an explanatory diagram illustrating a method of connecting the base unit, the relay unit and the end unit.

FIG. 21 illustrates a method for assembling the units thus constructed into an example of a multi-optical-path photoelectric switch according to the invention.

Figure 22:
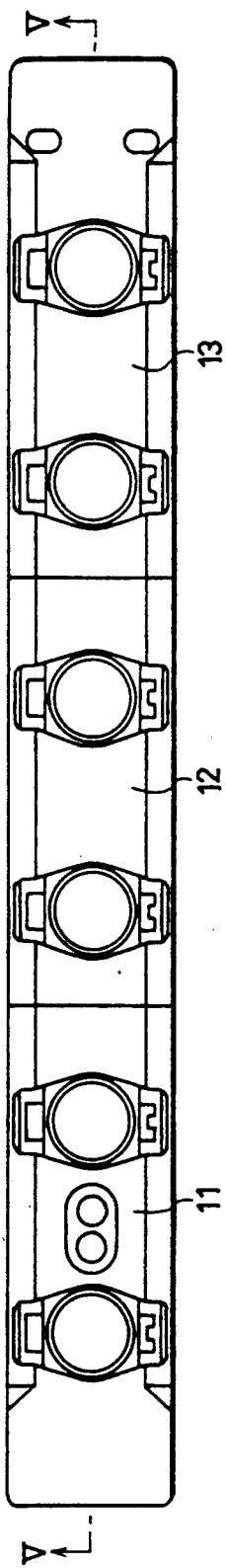
Figure 23:
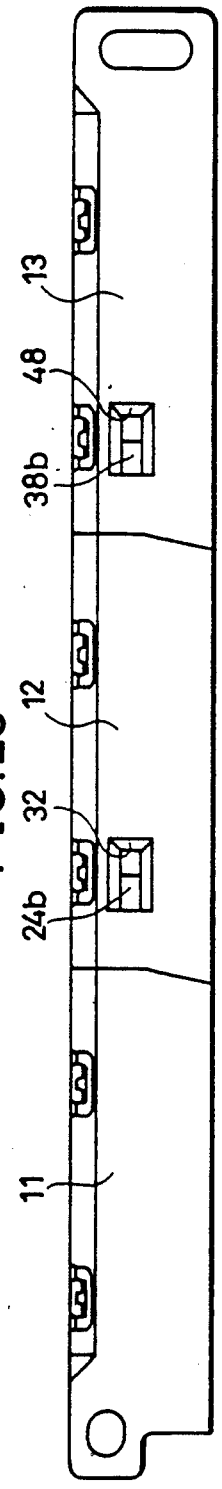

As is apparent from FIG. 21, the connected part 18 of the base unit 11 is inserted into the connecting part 32 of the relay unit 12, and the connected part 33 of the latter is inserted into the end unit 13. In this operation, the engaging protrusions 24b of the engaging member 24 of the base unit 11 are elastically engaged with the engaging holes 42 of the relay unit 12 with the aid of the elastic pieces 24a; and similarly the engaging protrusions 38b of the engaging members 38 of the relay unit 12 are elastically engaged with the engaging holes 48 of the end unit 13 with the aid of the elastic pieces 38a. Therefore, as shown in FIGS. 22 and 23, the base unit 11 is mechanically connected to the relay unit 12, and the latter is also mechanically connected to the end unit 13.

Figure 24:
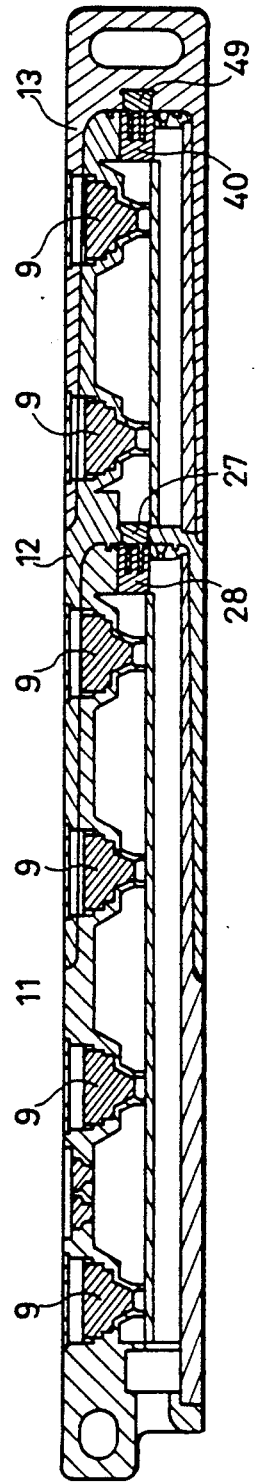
Figure 25:
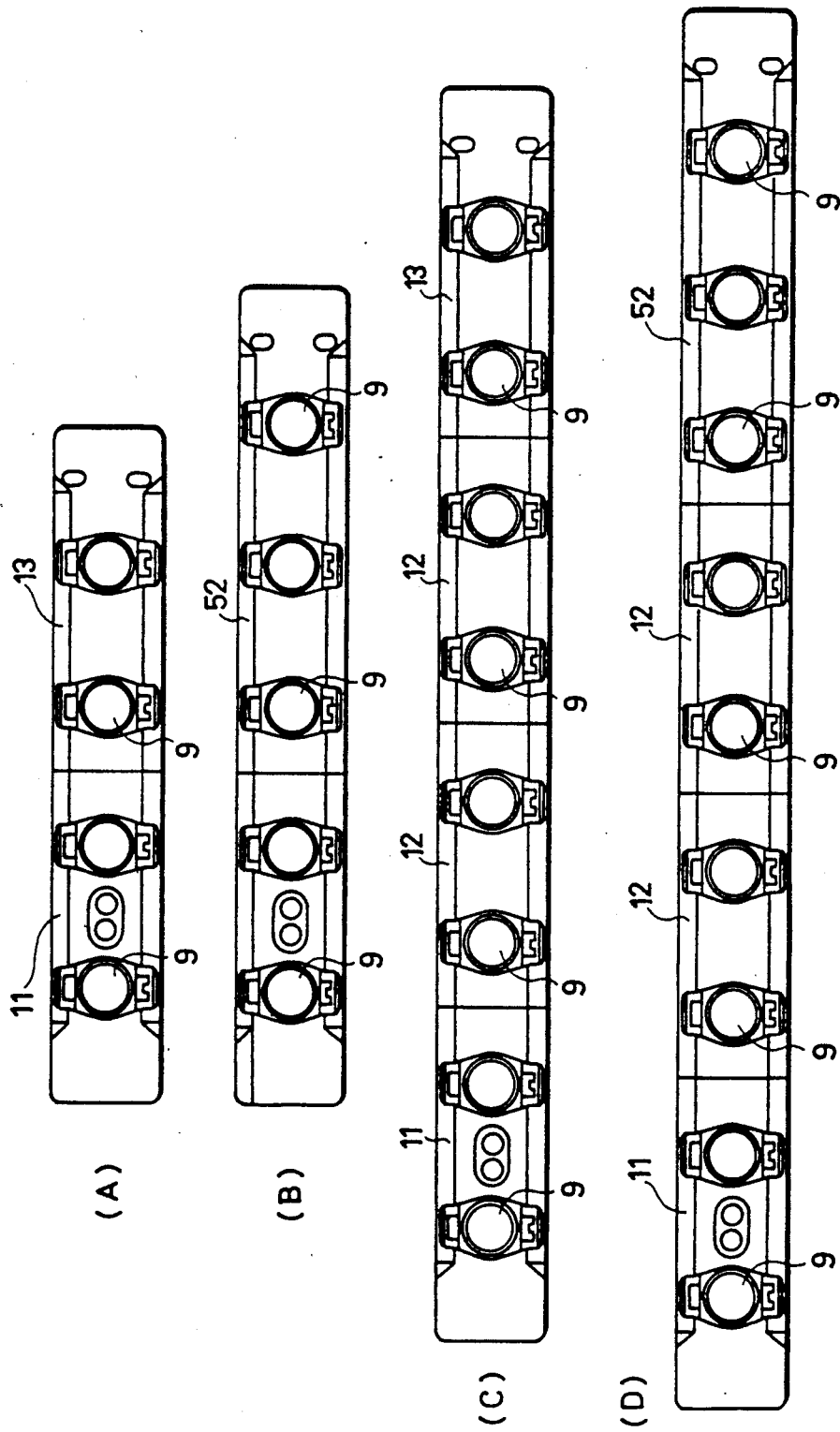

At the same time, as shown in FIG. 24, the female connector 28 of the base unit 11 is engaged with the male connector 27 of the relay connector 12 and the female connector 40 of the latter is engaged with the male connector 49 of the end unit 13.

FIGS. 25(A) through 25(D) show examples of the light-detecting section 10 of the photoelectric switch according to the invention. More specifically, in the case of FIG. 25(A), the base unit 11 is connected directly to the end unit 13; in the case of FIG. 25(B), the base unit 11 is connected to the end unit 52; in the case of FIG. 25(C), the base unit 11 is connected through two relay units 12 to the end unit 113; and in the case of FIG. 25(D) the base unit 11 is connected through two relay units 12 to the end unit 52. As is apparent from the above description, a light-detecting section having a desired number of light-detecting elements 9 can be formed by connecting the corresponding number of relay units 12.

Figure 26:
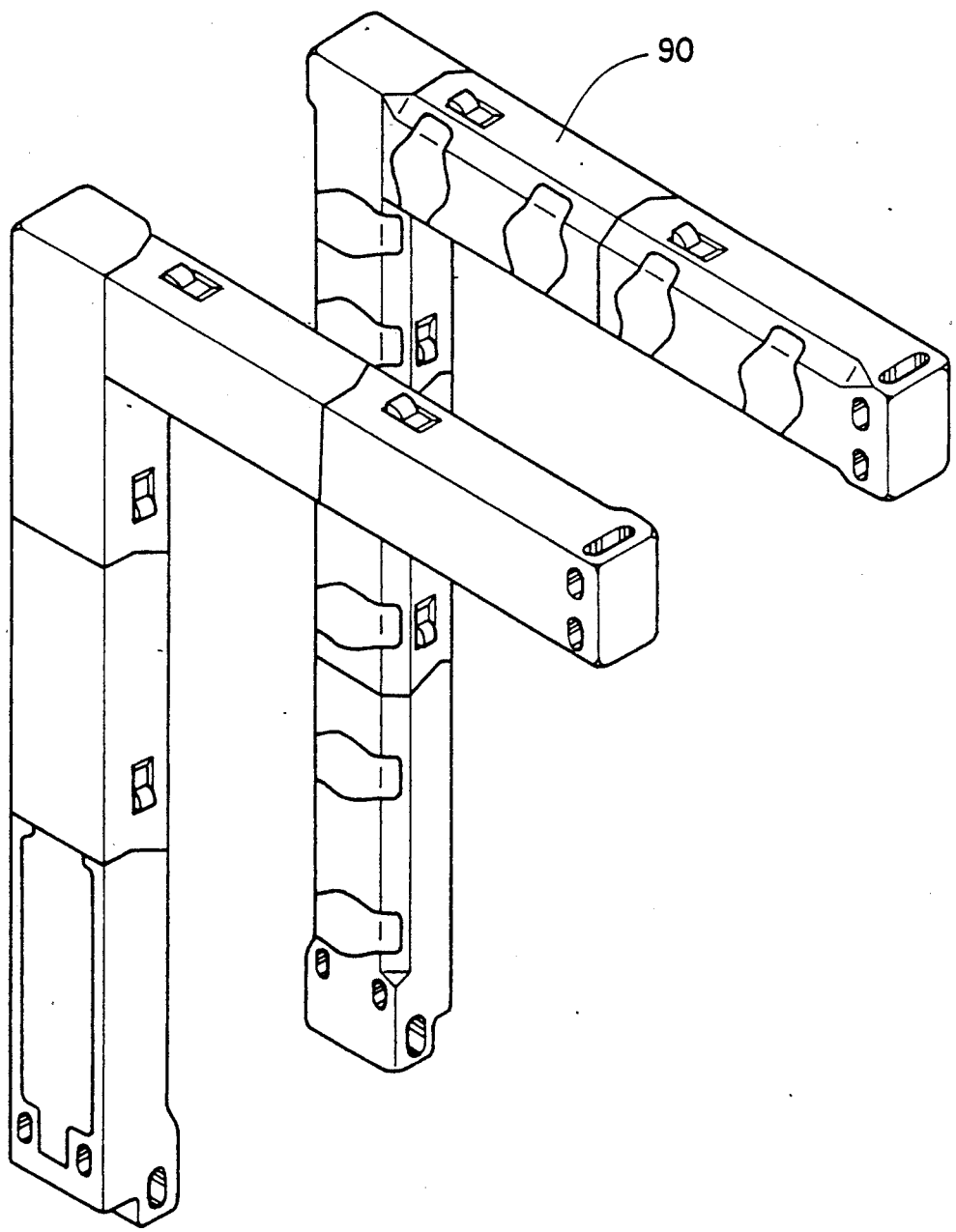
FIG. 26 is a perspective view showing another example of a photoelectric switch which uses a second example of the relay unit, which is bent at a predetermined angle.
Figure 27:
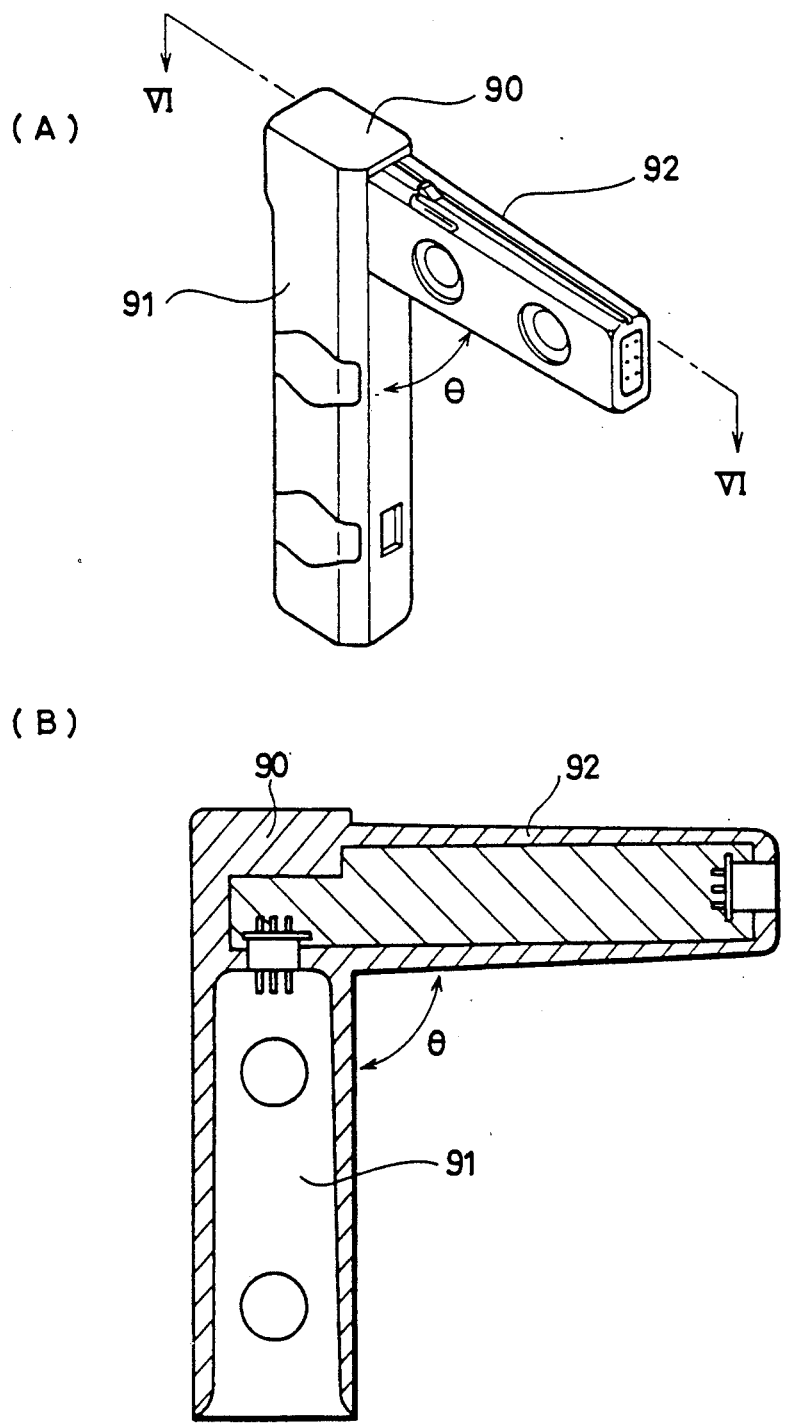
FIG. 27(A) is a perspective view of the relay unit shown in FIG. 26.
FIG. 27(B) is a sectional view taken along a line VI—VI in FIG. 27(A)

The relay unit may be modified as shown in FIGS. 26 through 30. In the case of FIGS. 26 and 27, a relay unit is formed of a connecting part 91 and a connected part 92 which forms a predetermined angle θ (90° in the modification). The internal structure of the relay unit 90 is the same as that of the above-described relay unit 12, except that it is bent. If a number of relay units bent at various angles are provided, the detection plane can be readily and freely changed.

Figure 28:
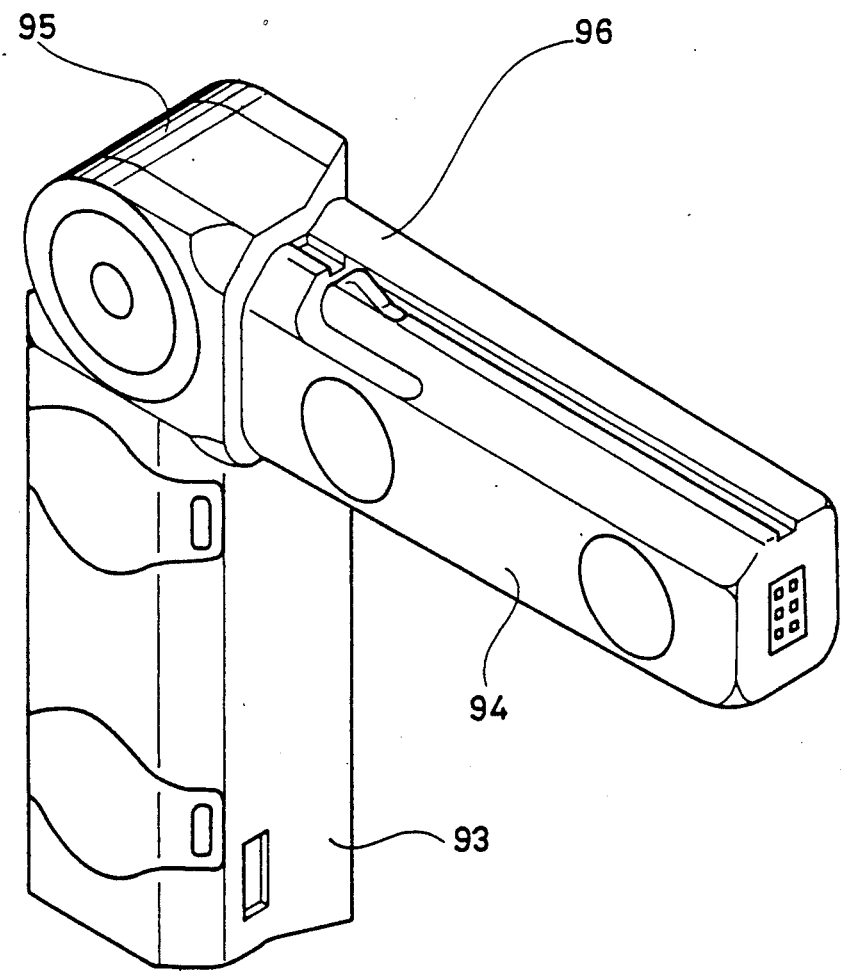
FIG. 28 is a perspective view of a third example of the relay unit having a movable connecting member.

Instead of the relay unit 90 bent fixedly, a relay unit 96 may be employed which, as shown in FIG. 28, has angle adjusting means, namely, a movable connecting member disposed between a connecting part 93 and a connected part 94 so that the angle between the connecting part 93 and the connected part 94 can be changed freely.

Figure 29:
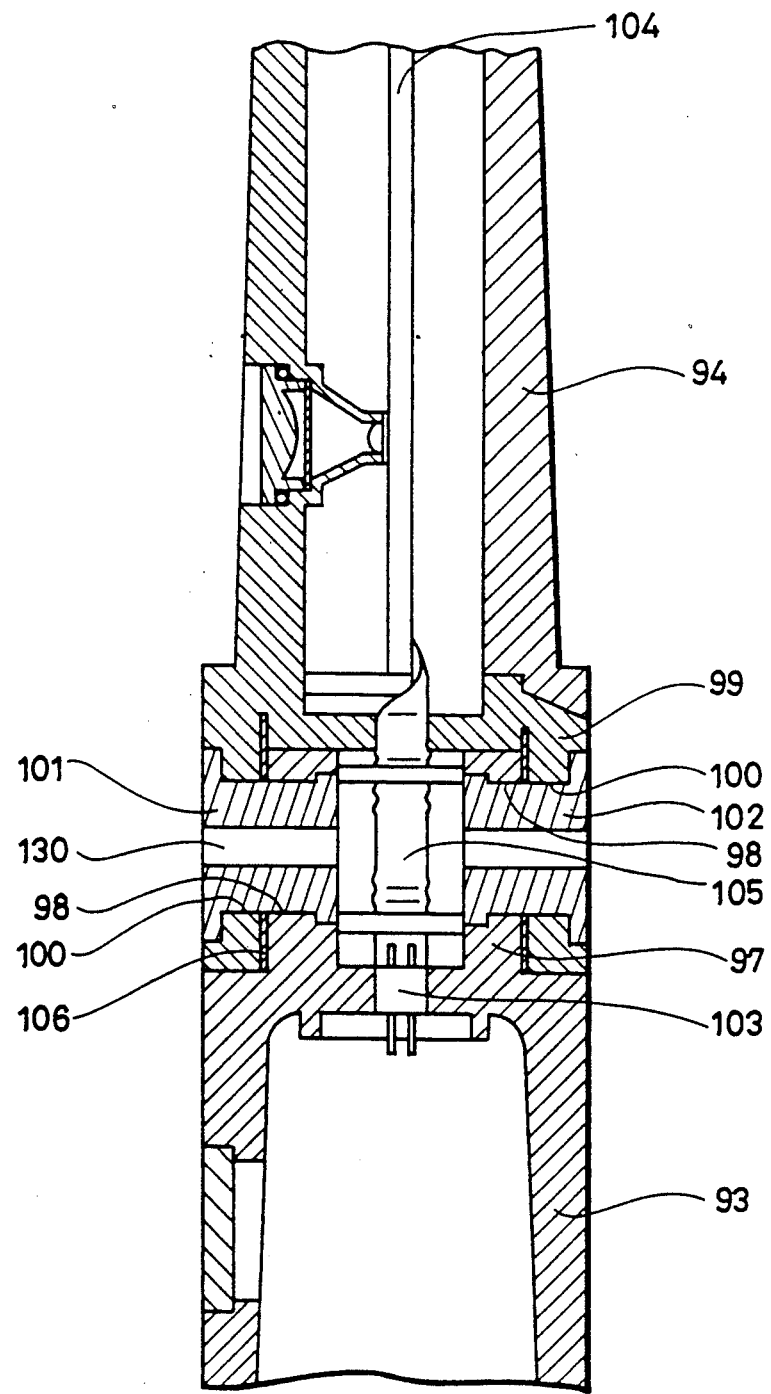
FIG. 29 is a sectional view showing a fourth example of the relay unit showing essentially its movable connecting member.

FIG. 29 is a sectional diagram showing the movable connecting member 95 with the connecting part 93 and the connected part 94 held in a line. The connecting part 93 has a protrusion at its end which extends towards the movable connecting member 95, and the extrusion has a hole 98, thus serving as a hinge frame 97. The connected part 94 has a recess in its end portion which is engageable with the protrusion of the connecting part 93, and a hole 100 in the end portion of the connected part 94 so that the end portion serves as a hinge frame 99. When the connecting part 93 is coupled to the connected part 94 in such a manner that the hinge frame 99 embraces the hinge frame 97, the holes 98 and 100 are brought into alignment with each other, thus forming a hinge hole 130. Two pins 101 and 102 are inserted into the hinge hole from the front surface and the rear surface of the relay unit, thereby to fasten the hinge frames 97 and 99 to each other. Thus the connecting part 93 and the connected part 94 are swingably coupled to each other.

In the relay unit shown in FIG. 29, the male connector 103 is connected through a flexible substrate 105 to the substrate 104. Since the pins are inserted into the hinge frames 97 and 99, the latter (97 and 99) are pushed against each other with a certain stress. In order to couple the hinge frames to each other more tightly, packings 106 are interposed therebetween. Therefore, the connecting part 93 and the connected part 94 can be readily swung to form a desired angle therebetween, and can be held in position.

Figure 30:
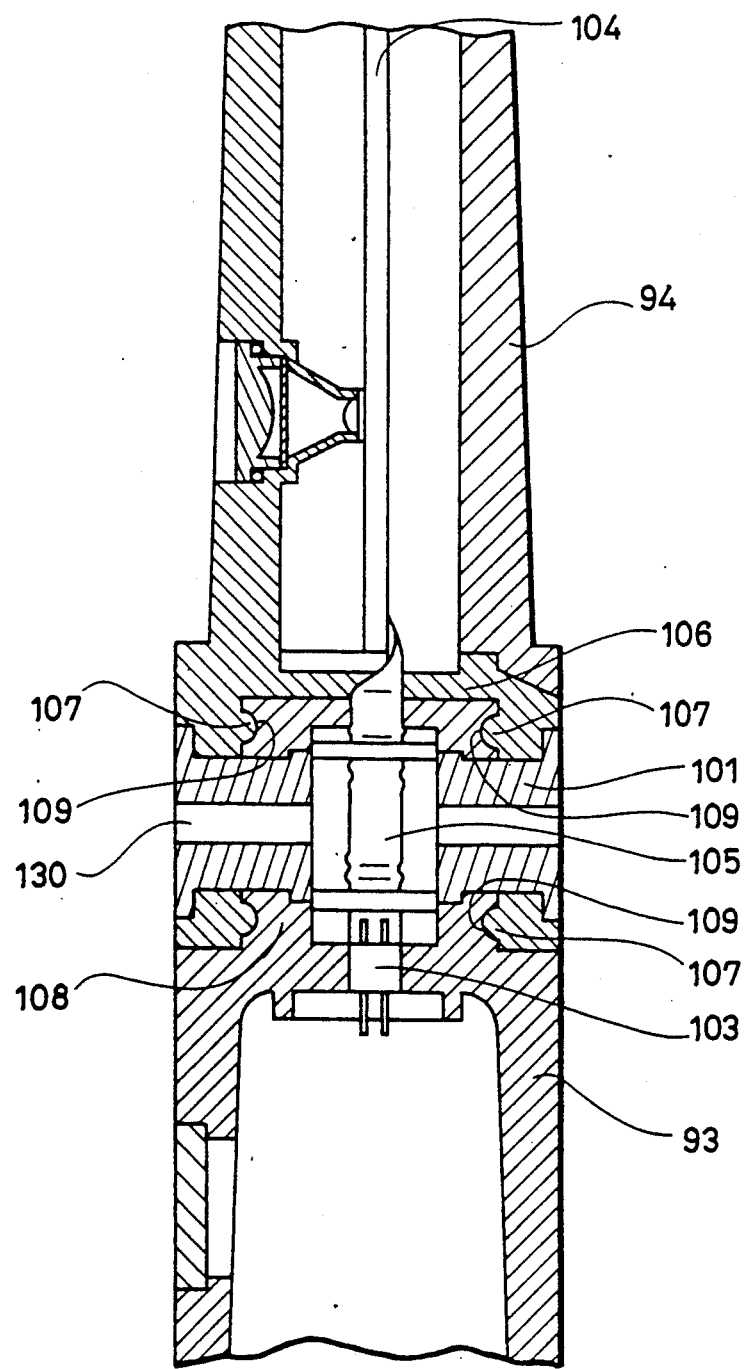
FIG. 30 is also a sectional view showing a fifth example of the relay unit showing its movable connecting member.

Another example of the movable connecting member 95 is as shown in FIG. 30, in which parts corresponding functionally to those which have been already described with reference to FIG. 29 are therefore designated by the same reference numerals.

As shown in FIG. 30, semispherical protrusions 107 are formed on the inner walls of the hinge frame 106 of the connected part 94 at equal intervals, while semispherical recesses 109 are formed in the outer walls of the hinge frame 108 of the connecting part 93. The angle formed between the connecting part 93 and the connected part 94 can be changed by swinging the latter. In this operation, the protrusions 107 are caused to disengage from the recesses 109, whereupon the connected part 94 is positioned unstably. As the connected part 94 is further turned, the protrusions 107 are engaged with the adjacent recesses 109 so that the connected part 94 is positioned stably. Thus, the angle between the connecting part 93 and the connected part 94 can be adjusted according to the pitch of the protrusions 107 and the recesses 109. It goes without saying that the protrusions 107 may be formed on the connecting part 93, and the recesses 109 may be formed on the connected part 94.

FIG. 31 shows a relay unit 110 which may be used in the case where, in the photoelectric switch, a part of the detection plane is employed as a non-detection region. The connection part 111 of the relay unit 110 is similar in structure to that of the above-described relay unit 12; however, it should be noted that the connected part 112 accommodates no substrate. It may have light-detecting elements if necessary. The connected part 112 has a male connector 113 and a female connector 114 at both ends, which are connected to each other through a signal transmitting line, namely, a cable 115. The cable 115 may be replaced by a circuit board having the same function.

As the case may be, the internal structure of the relay unit 90, which is bent at a predetermined angle as shown in FIG. 27(A), may be modified as shown in FIG. 27(B).

Figure 32:
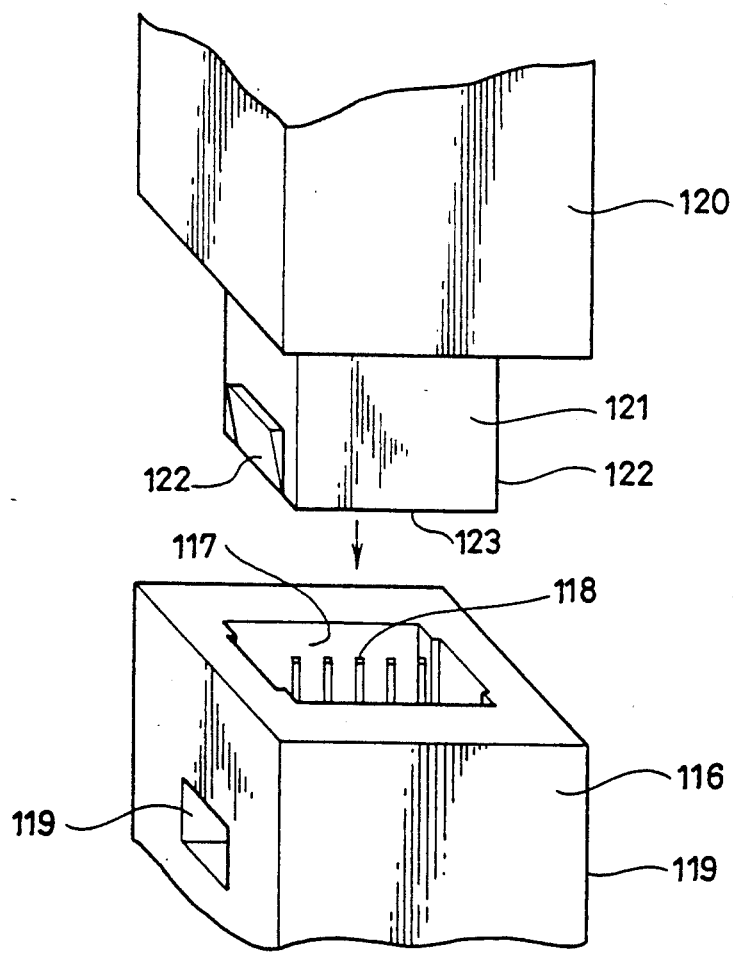
FIG. 32 is a perspective view illustrating another method of connecting the units to form the photoelectric switch.
Figure 35:
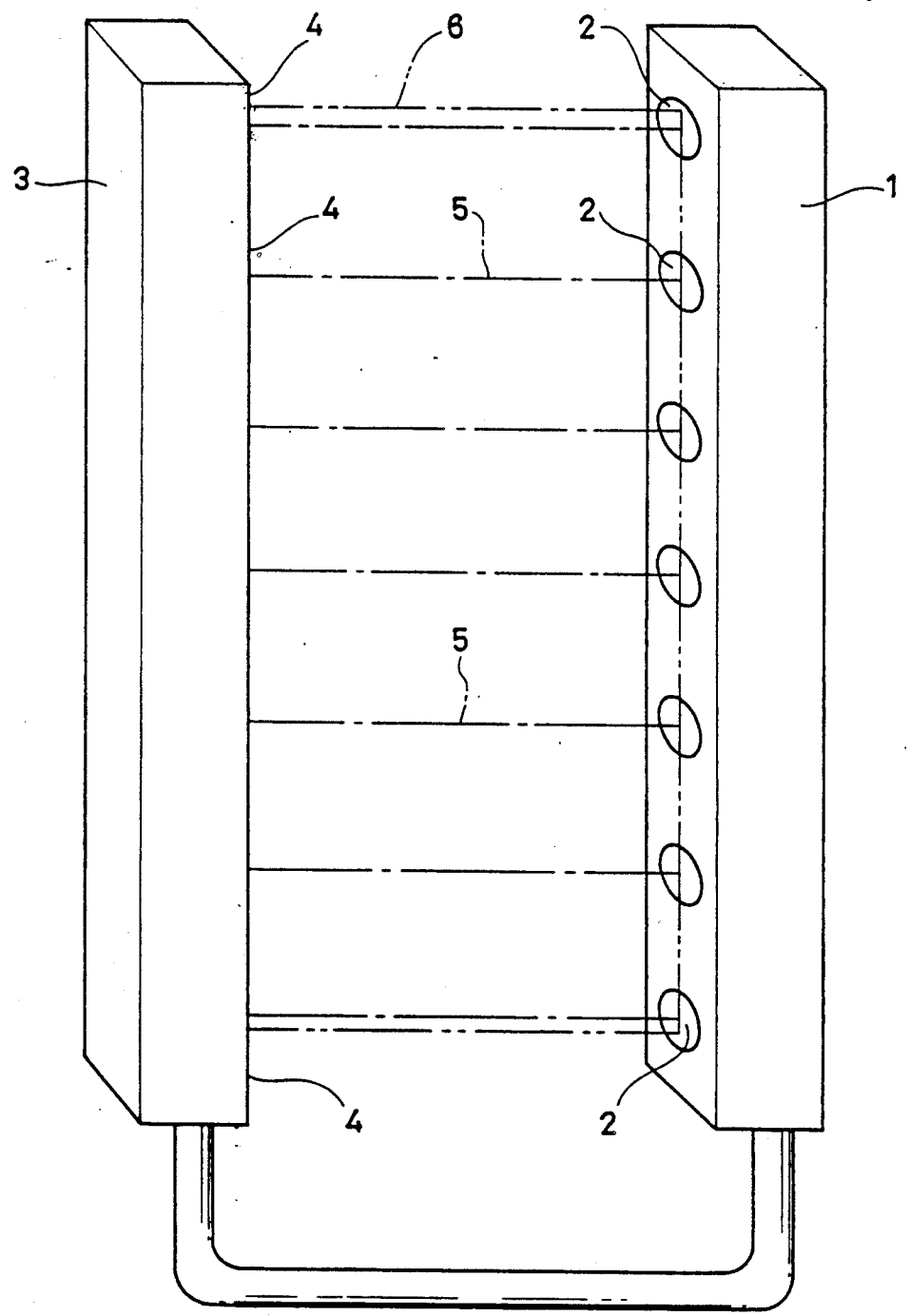
FIG. 35 is a perspective view showing a conventional photoelectric switch.

FIG. 32 shows another example of the structure of the connecting parts of the units (the base unit, the relay unit, and the end unit). For convenience in description, a connecting unit and a connected unit will be referred to as "a first unit" and "a second unit", respectively.

As shown in FIG. 32, a substantially square recess 117 is formed in the end face of the first unit 116 and a male connector 118 is provided in the recess 117. Locking holes 119 and 119 are formed in both sides of the first unit 116 in such a manner that they are communicated with the recess 117. On the other hand, the second unit 120 has a protrusion 121 at the end which is slightly smaller in outer dimensions that the recess 117, and has pawls 122 and 122 on both sides. A female connector 123 (not shown) to be engaged with the male connector 118 is provided in the end face of the protrusion 121. When the protrusion 121 is inserted into the recess 117, the male connector 118 is engaged with the male connector 118 while the pawls 122 are engaged with the locking holes 119. Thus, the first unit 116 and the second unit 120 have been mechanically and electrically connected to each other.

FIG. 33 shows a further example of the structure of the connecting parts of the units. Substantially T-shaped protrusions 125 and 126 are formed on the end face of a first unit, and a male connector 128 with male terminals 127 is secured to the top of the protrusion 125. Engaging grooves 129 are formed in the front and rear surfaces of the first unit 125. On the other hand, a second unit has a groove 131 in its end portion which is substantially similar in configuration to the protrusions 125 and 126 of the first unit. A female connector 133 having female terminals 132 as shown in FIG. 34 is provided at the bottom of the groove 131. An engaging groove 134 is formed in the front surface of the second unit 130 in such a manner that it converges inwardly.

The first and second units 124 and 130 are joined together as follows: The protrusions 125 and 126 of the first unit 124 are inserted into the groove 133 of the second unit 130 so that the male connector 128 is engaged with the female connector 133. Under this condition, a connecting member 136 with elastic parts 135a and 135a is inserted into the engaging grooves 129 and 134 so that the first unit 124 is pushed upwardly (in the figure) while the second unit 130 is pushed upwardly. Thus, the first and second unit 124 and 130 have been positively connected each other.

While preferred embodiments of the invention have been described, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A photoelectric switch comprising a light-emitting section having a plurality of aligned light-emitting elements, and a light-detecting section having a plurality of light-detecting elements aligned in such a manner as to confront with said light-emitting elements, in which each of said light-emitting section and light-detecting section comprises:
   a base unit including a housing accommodating said elements and an electrical circuit, said housing having a step substantially at the middle thereof formed in such a manner that said housing is divided into a connected part which extends from said step towards one of the ends of said housing, and a base part which extends towards the other end, said connected part being thinner than said base part, said base unit having openings in the front surface thereof at equal intervals in each of which one of said elements is arranged;
   a relay unit including a housing into which said connected part of said base unit is inserted, and which accommodates at least another one of said elements and an electrical circuit, said housing of said relay unit having a step substantially at the middle thereof formed in such a manner that said housing is divided into a connected part which extends from said step towards one of the ends of said relay unit and a hollow connecting part which extends from said step towards the other end so as to receive said connected part of said base unit, said connecting part of said relay unit being wider than said connected part of said relay unit, said connected part of said relay unit having openings in the front surface thereof at equal intervals in which at least another one of said elements is arranged, and said connecting part of said relay unit having openings in the front surface thereof at equal intervals aligned with said openings of said connected part of said base unit when received therein; and
   an end unit including a housing into which said connected part of said relay unit is inserted, said housing of said end unit having a hollow connecting part which has openings in the front surface thereof at equal intervals,
   said base unit being connected to said end unit through at least one relay unit so that said light-emitting section or light-detecting section has a desired number of said elements.

2. The photoelectric switch as claimed in claim 1, in which each of said light-emitting section and said light-detecting section further comprises: a movable connecting member which is connected between said connected part of said base unit and said connecting part of said relay unit so as to allow said base unit and said relay unit to form a desired angle therebetween.

3. The photoelectric switch as claimed in claim 1, in which each of said light-emitting section and said light-detecting section further comprises: another relay unit which has no electrical circuit, but signal transmitting means for transmitting through said relay unit signals necessary for signal processing operations.

4. A photoelectric switch as claimed in claim 1, in which:
   (a) in said light-emitting section,
   said base unit comprises:
      reference clock signal generating means for producing a reference clock signal
      timing signal generating means for producing a timing signal according to said reference clock signal;
      a first shift register for controlling the light emission of said light-emitting elements in said base unit of said light-emitting section, said first shift register shifting said timing signal in synchronization with said reference clock signal and producing a first carrier signal, and
   said relay unit comprises:
      a second shift register for controlling the light emission of said light-emitting elements in said relay unit of said light-emitting section, said second shift register shifting said first carrier signal in synchronization with said reference clock signal and producing a second carrier signal, and
   (b) in said light-detecting section,
   said base unit comprises:
      a plurality of gate means for gating light detection signals provided by said light-detecting elements in said base unit of said light-detecting section;
      a third shift register for controlling the operations of said gating means, said third shift register shifting said timing signal in synchronization with said reference clock signal and outputting a third carrier signal;
      first light-detecting state discriminating means for outputting, in response to outputs of said gate means, a signal indicating when all light-detecting elements in said base unit of said light-detecting section are receiving a light beam; and
   said relay unit comprises:
      a plurality of gate means for gating light detection signals provided by said light-detecting elements in said relay unit of said light-detecting section;
      a fourth shift register for controlling the operations of said gate means, said fourth shift register shifting said third carrier signal in synchronization with said reference clock signal, and producing a fourth carrier signal; and
      second light-detecting state discriminating means receiving an output of said gate means and outputting a signal indicating when all of said light-detecting elements in said relay unit of said light-detecting section are receiving a light beam,
   wherein said base unit of said light-detecting section further comprises:

a light-detecting state discriminating circuit which receives both outputs of said first and second light-detecting state discriminating means; and an output circuit driven by both said light-detecting state discriminating circuits.

5. A photoelectric switch comprising a light-emitting section having a plurality of aligned light-emitting elements, and a light-detecting section having a plurality of light-detecting elements aligned in such a manner as to confront with respective ones of said light-emitting elements, in which each of said light-emitting section and light-detecting section comprises:

a base unit including a housing which accommodates a plurality of said elements and an electrical circuit, said housing having openings in the front surface thereof at equal intervals in which said elements are arranged, and an engaging recess in one end face thereof, which recess has a male connector at the bottom, and two engaging through-holes formed in respective side walls of said engaging recess;

a relay unit including a housing which accommodates others of said elements and an electrical circuit, said housing having openings in the front surface thereof at equal intervals, in some of which said others of said elements are arranged, an engaging recess in one end face thereof, which recess has a male connector at the bottom, two engaging through-holes formed in respective side walls of said engaging recess, and an engaging protrusion with a female connector on the other end face thereof, said engaging protrusion having engaging pawls on both sides; and an end unit including a housing which has openings in the front surface thereof at equal intervals in which ones of said elements of a relay unit connected thereto are arranged, said housing having an engaging protrusion with a female connector at one end face, and engaging pawls on both sides of said engaging protrusion, said base unit being connected to said end unit through at least one relay unit so that said photoelectric switch has a required number of said elements.

6. A photoelectric switch comprising a light-emitting section having a plurality of aligned light-emitting elements, and a light-detecting section having a plurality of light-detecting elements aligned in such a manner as to confront with said light-emitting elements, wherein each of said light-emitting section and light-detecting section comprises a base unit, at least one relay unit, and an end unit connected to said base unit through said relay unit, said base unit comprising:

a housing having means for mechanically connecting said base unit to said relay unit, said housing accommodating therein a power source for supplying power to said relay unit and said end unit; and means provided at an end of said housing for electrically connecting said base unit to said relay unit, said relay unit comprising:

a housing having means for mechanically connecting said relay unit to said base unit and said end unit;

first means provided at an end of said housing for electrically connecting said relay unit to said base unit; and second means provided at the other end of said housing for electrically connecting said relay unit to said end unit; and said end unit comprising:

a housing having means for mechanically connecting said end unit to said relay unit; and means provided at an end of said housing for electrically connecting said end unit to said relay unit.

7. The photoelectric switch according to claim 6, wherein said mechanically connecting means and said electrically connecting means constitute one unit.

* * * * *

UNITED STATES PATENT AND TRADEMARK OFFICE
CERTIFICATE OF CORRECTION

PATENT NO. : 5,003,169

DATED : MARCH 26, 1991

INVENTOR(S) : SAKAGUCHI ET AL.

It is certified that error appears in the above-identified patent and that said Letters Patent is hereby corrected as shown below:

ON THE TITLE PAGE:

Assignee: Change "Keyenci Corporation" to --Keyence Corporation--.

Signed and Sealed this

Twenty-ninth Day of September, 1992

Attest:

DOUGLAS B. COMER

Attesting Officer      Acting Commissioner of Patents and Trademarks